United States Patent [19]

South

[11] Patent Number: 4,530,555

[45] Date of Patent: Jul. 23, 1985

[54] ELECTRICAL OUTLET GUARD

[76] Inventor: Robert E. South, P.O. Box 1674, Warsaw, Ind. 46580

[21] Appl. No.: 501,481

[22] Filed: Jun. 6, 1983

[51] Int. Cl.³ .......................................... H01R 13/44
[52] U.S. Cl. ........................................ 339/39; 339/36
[58] Field of Search ................. 339/36, 37, 39, 44 R, 339/82, 75 P, 44 M

[56] References Cited

U.S. PATENT DOCUMENTS

| | | | |
|---|---|---|---|
| 2,510,745 | 6/1950 | Kilgore | 174/67 |
| 2,715,212 | 8/1955 | Swanson et al. | 339/44 M |
| 2,880,264 | 3/1959 | Ruskin | 174/67 |
| 2,942,226 | 6/1960 | Low | 339/75 P |
| 3,189,212 | 6/1965 | Bellek | 339/44 R |
| 3,204,807 | 9/1965 | Ramsing | 174/67 |
| 3,335,390 | 8/1967 | Pruonto et al. | 339/39 |
| 3,491,327 | 1/1970 | Tait et al. | 174/67 |
| 4,424,407 | 1/1984 | Barbic | 339/75 P |

*Primary Examiner*—Gil Weidenfeld
*Assistant Examiner*—Paula A. Austin
*Attorney, Agent, or Firm*—Harpman & Harpman

[57] ABSTRACT

An electrical outlet guard that comprises a generally rectangular box-like structure having top ends and sides and an open bottom and open front that is secured over an electrical outlet. An attachment bracket is secured to the outlet and provides a spring loaded fastener movably securing the guard in place. Provisions are made in the guard to allow for passage of a plug cord from the enclosure.

3 Claims, 4 Drawing Figures

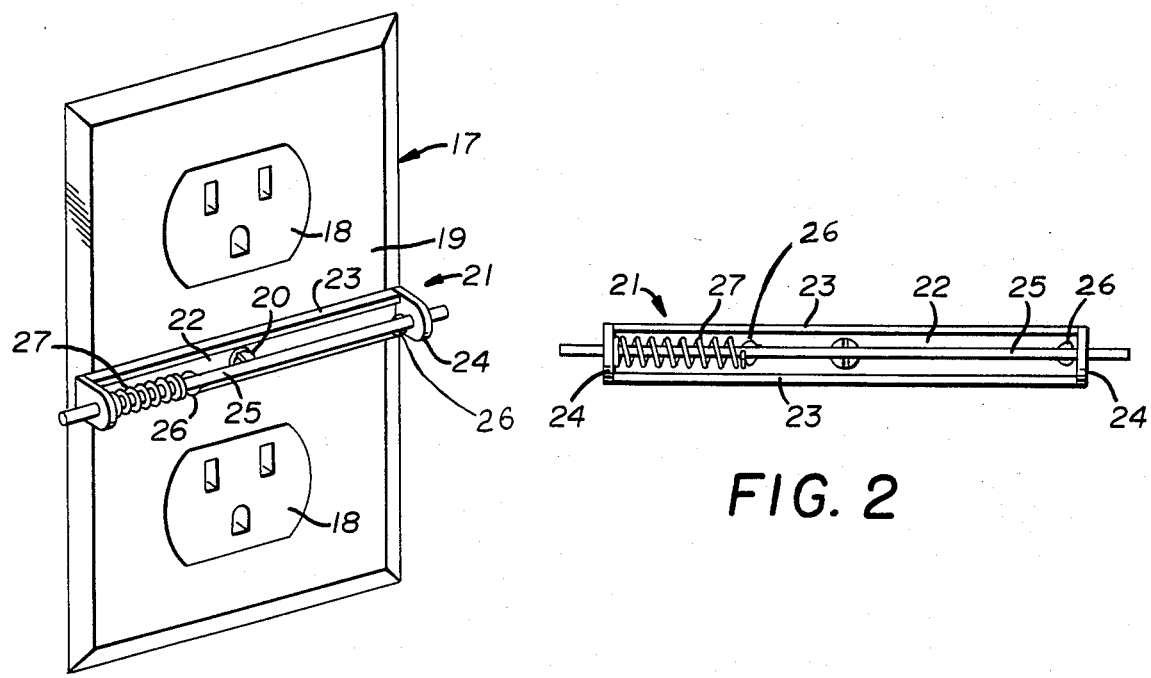
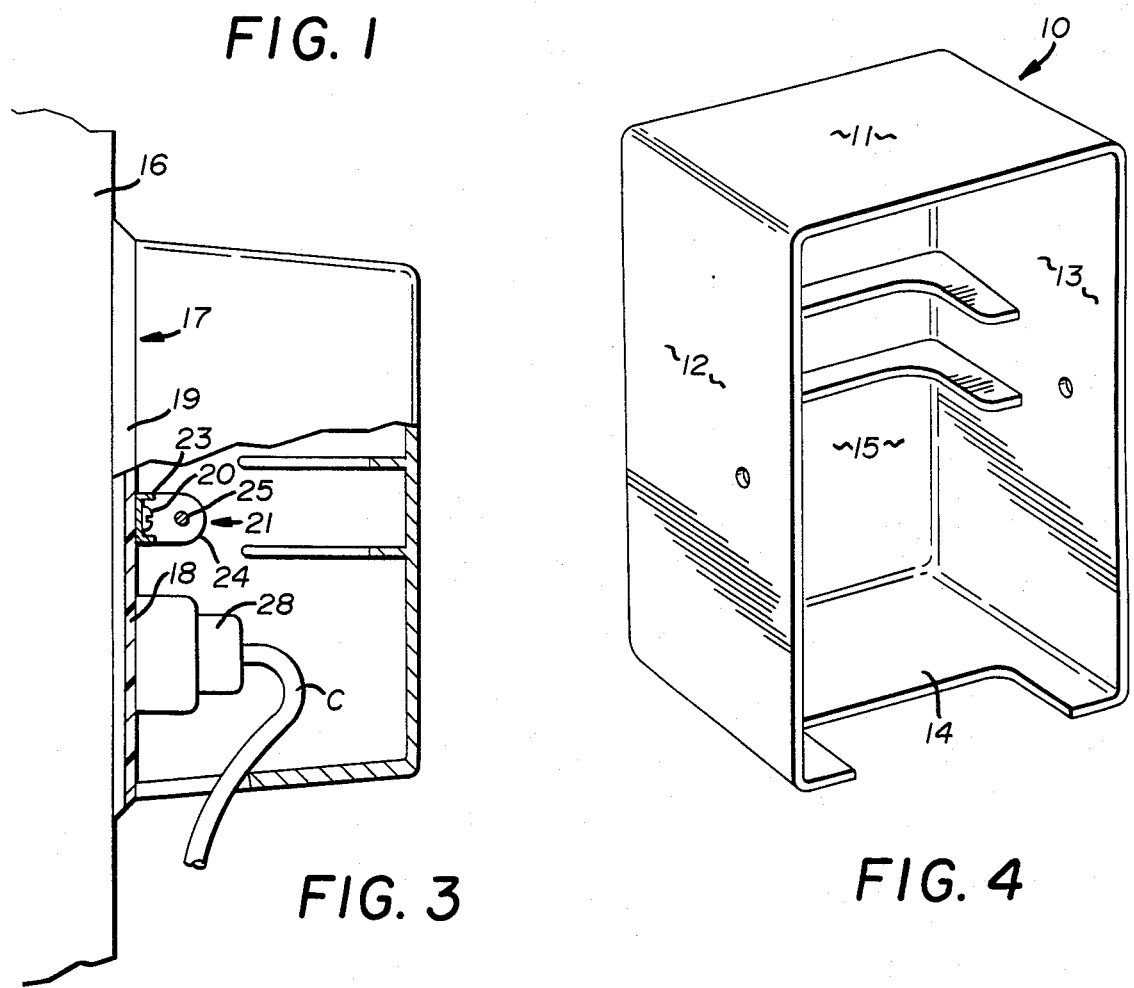

ELECTRICAL OUTLET GUARD

BACKGROUND OF THE INVENTION

1. Field of the Invention

This invention relates to safety devices for electrical outlets, normally found in houses, to prevent accidental shock to individuals, especially children who play with power cords and outlets.

2. Description of the Prior Art

Prior art devices of this type have relied on a variety of different designs to attempt to protect the electrical outlets, see for example U.S. Pat. Nos. 2,510,745, 2,880,264, 3,204,870 and 3,491,327.

In U.S. Pat. No. 2,880,264 and U.S. Pat. No. 2,510,745, outlet covers are shown which cover the outlet plates and are secured thereto by resilient clamps.

In U.S. Pat. No. 2,510,745, the cover is engaged on a frame positioned behind the outlet plate and in U.S. Pat. No. 2,880,264 a modified plate is substituted for the original one on the outlet and the cover is hinged thereto.

In U.S. Pat. No. 3,204,807, a hinged electrical cover plate is disclosed wherein a new cover plate is provided having a hinged switch guard covering the wall switch.

U.S. Pat. No. 3,491,327 discloses a safety cover having tapered flanges on its sides that are slipped under the existing wall plate.

Applicant's electrical outlet guard fits over the electrical outlet plate and is held in place by a spring urged pin that is secured to the outlet plate by the existing cover plate screw. The guard is easily removed by an adult, yet being difficult for a child to remove, thus preventing accidental shock.

SUMMARY OF THE INVENTION

An electrical outlet guard that covers an electrical outlet with electrical plugs in place. The guard is removably positioned on the wall plate by a spring loaded fastener system that allows easy access for the adult and is child resistant. The guard is a generally rectangular box-like structure with one side open so it can be placed over the outlet having the plugs therein.

DESCRIPTION OF THE DRAWINGS

FIG. 1 is a perspective view of an electrical outlet with a portion of the guard in place;

FIG. 2 is an enlarged front plan view of the portion of the guard seen in FIG. 1;

FIG. 3 is a partial section of the guard shown in place on an electrical outlet; and FIG. 4 is a perspective view of the cover portion of the guard.

DESCRIPTION OF THE PREFERRED EMBODIMENT

An electrical outlet guard is comprised of a cover 10 having a generally rectangular shape with a closed top portion 11, closed side portions 12 and 13 and a partially opened bottom portion 14 with a closed back 15 and an open front as best seen in FIGS. 3 and 4 of the drawings. The open front faces a wall 16 having an electrical outlet 17 positioned therein. The outlet 17 is comprised of a plug receptacle 18 and a cover plate 19 secured over the same by a fastener 20 as best seen in FIGS. 1 and 3 of the drawings.

Referring now to FIGS. 1, 2 and 3 of the drawings, a mounting bracket 21 can be seen having an elongated rectangular base 22 with parallel longitudinal flanges 23 and oppositely disposed upstanding tabs 24 on both ends. Each of the tabs 24 is apertured adjacent its end to receive a pin 25 extending therethrough. The pin 25 has flattened portions 26 inwardly of its ends to engage a spring 27 positioned on the pin and the tab 24. The coil spring 27 is engaged between one of the tabs 24 and the flattened portion 26 of the pin. Moving the pin 25 so that the flattened portion engages the spring 27 compresses the same toward one tab 24, the pin will be spring urged and will return to its original position when released between the tabs 24.

The base 22 of the mounting bracket 21 is secured to the electrical outlet 17 by removing the fastener 20, positioning the mounting bracket 21 on top of the cover plate 19 and securing both to the plug receptacle 18 with the fastener 20, the pin 25 is then installed.

To install the electrical outlet guard, the mounting bracket 21 is secured to the electrical outlet 17 as hereinbefore described. The cover 10 is then positioned over the electrical outlet 17 so as to cover an electrical plug 28 in the receptacle 18 and to align apertures in the side portions 12 and 13 adjacent the open face of the cover with the ends of the pin 25 by depressing the same so that registration of the pin 25 with the apertures is accomplished. The elongated base is resilient.

The cover is now firmly secured to the electrical outlet 17 with the electrical plugs 28 safely within and their cords C extending outwardly of the cover 10 through the partially opened bottom portion 14.

To remove the cover 10, one end of the pin 25 is pressed inwardly against the spring 27 releasing the side portion 13 allowing the cover 10 to be tilted away from the outlet 17 and the cover 10 removed from engagement with the other end of the pin 25. In use, the cover 10 effectively restricts access to the electrical outlet and the plugs within providing quick access by adults while preventing removal of the guard by young children, thus avoiding accidental shock.

It will be understood by those skilled in the art that various changes and modifications may be made herein without departing from the spirit of the invention and having thus described my invention, what I claim is:

1. An improvement to an electrical outlet guard cover used to protect power cords plugged into electrical outlets, the improvement comprising means for securing the outlet guard cover to said electrical outlet, said outlet guard comprising a cover having a closed top portion, closed side portions, a closed back and a partially open bottom defining an open front being of a generally rectangular shape and said means for securing the outlet guard cover to said electrical outlet comprises a mounting bracket having an elongated base secured to said outlet, a pin having a flattened portion inwardly of one end thereof, a coil spring positioned on said pin and apertures in said cover for registering with said pin when said pin is in spring urged position.

2. The electrical outlet guard of claim 1 wherein said elongated base is resilient so that the ends thereof are movable with respect to said electrical outlet.

3. The electrical outlet guard of claim 1 wherein said bracket has oppositely disposed apertured end tabs and said pin is movably positioned therethrough.

* * * * *